US012591946B2

(12) United States Patent　　(10) Patent No.:　US 12,591,946 B2

Sopena Novales et al.　　(45) **Date of Patent:　\*Mar. 31, 2026**

(54) DETECTING ERROR IN SAFETY-CRITICAL GPU BY MONITORING FOR RESPONSE TO AN INSTRUCTION

(71) Applicant: Imagination Technologies Limited, Kings Langley (GB)

(72) Inventors: Mario Sopena Novales, Hertfordshire (GB); Philip Morris, Hertfordshire (GB)

(73) Assignee: Imagination Technologies Limited, Kings Langley (GB)

( \* ) Notice: Subject to any disclaimer, the term of this patent is extended or adjusted under 35 U.S.C. 154(b) by 0 days.

This patent is subject to a terminal disclaimer.

(21) Appl. No.: 18/736,418

(22) Filed: Jun. 6, 2024

(65) Prior Publication Data

US 2024/0320781 A1　　Sep. 26, 2024

Related U.S. Application Data

(63) Continuation of application No. 18/100,510, filed on Jan. 23, 2023, now Pat. No. 12,033,236, which is a (Continued)

(30) Foreign Application Priority Data

Feb. 28, 2020　(GB) ...................................... 2002897

(51) Int. Cl.
　*G06T 1/20*　　(2006.01)
　*G06F 9/445*　　(2018.01)
　(Continued)

(52) U.S. Cl.
　CPC ............ G06T 1/20 (2013.01); G06F 9/44505 (2013.01); G06T 1/60 (2013.01); G06F 11/1004 (2013.01)

(58) Field of Classification Search
　CPC ......... G06T 1/20; G06T 1/60; G06F 9/44505; G06F 11/0751; G06F 11/0793; G06F 11/1004; G06F 11/1417; G06F 11/3024
　(Continued)

(56) References Cited

U.S. PATENT DOCUMENTS 8,250,412 B2 \*　8/2012　Cheng ................. G06F 11/0751
　　　　　　　　　　　　　　　345/503
9,298,556 B2　　3/2016　Mueller
　　　　　　　　　　(Continued)

FOREIGN PATENT DOCUMENTS

CN　　103946888 A　　7/2014
CN　　105786426 A　　7/2016
　　　　　　(Continued)

OTHER PUBLICATIONS

Anonymous, Checksum—Wikipedia, Apr. 15, 2015.
(Continued)

*Primary Examiner* — Jacinta M Crawford
(74) *Attorney, Agent, or Firm* — Potomac Law Group, PLLC; Vincent M DeLuca

(57)　　　ABSTRACT

A method of detecting an error at a graphics processing unit causes an instruction including a request for a response from a graphics processing unit to be provided to the graphics processing unit. A timer being configured to expire after a time period is initialised, and during the time period the graphics processing unit is monitored for the response from the graphics processing unit. An error is determined to have occurred in response to determining that no response was received from the graphics processing unit before the timer expired.

20 Claims, 6 Drawing Sheets

Related U.S. Application Data continuation of application No. 17/187,844, filed on Feb. 28, 2021, now Pat. No. 11,587,198.

(51) Int. Cl.
| | |
|---|---|
| *G06F 11/10* | (2006.01) |
| *G06T 1/60* | (2006.01) |

(58) Field of Classification Search
USPC .......................................................... 345/501
See application file for complete search history.

(56) References Cited

U.S. PATENT DOCUMENTS

| | | | |
|---|---|---|---|
| 10,673,439 B1 | 6/2020 | Ahmad et al. | |
| 11,587,197 B2 | 2/2023 | Novales et al. | |
| 2012/0317576 A1 | 12/2012 | Mueller et al. | |
| 2014/0267328 A1* | 9/2014 | Banack ..................... | G06T 1/20 345/522 |
| 2014/0325274 A1 | 10/2014 | Mueller | |
| 2015/0235338 A1 | 8/2015 | Alla et al. | |
| 2016/0253230 A1 | 9/2016 | Hui et al. | |
| 2016/0295205 A1 | 10/2016 | Lim et al. | |
| 2017/0154402 A1 | 6/2017 | Viggers et al. | |
| 2017/0177458 A1 | 6/2017 | Viggers et al. | |
| 2018/0121282 A1 | 5/2018 | Gonzalez et al. | |
| 2018/0231609 A1 | 8/2018 | Jain et al. | |
| 2019/0139263 A1 | 5/2019 | Gruber et al. | |
| 2019/0155678 A1 | 5/2019 | Hsiong et al. | |
| 2019/0171538 A1 | 6/2019 | Gulati et al. | |
| 2019/0196926 A1 | 6/2019 | Jong et al. | |
| 2019/0197651 A1 | 6/2019 | Johnson et al. | |
| 2019/0250974 A1 | 8/2019 | Van De et al. | |
| 2021/0182432 A1 | 6/2021 | Margalit | |
| 2021/0279834 A1 | 9/2021 | Novales et al. | |

FOREIGN PATENT DOCUMENTS

| | | |
|---|---|---|
| CN | 105809728 A | 7/2016 |
| CN | 107025681 A | 8/2017 |
| CN | 108305318 A | 7/2018 |
| CN | 113327189 A | 8/2021 |
| DE | 102015200292 A1 | 7/2016 |
| EP | 3355188 A1 | 8/2018 |

OTHER PUBLICATIONS

Rodriguez et al., "Testing Permanent Faults in Pipeline Registers of GPGPUs: A Multi-kemel Approach," 25th Int'l Symposium on On-line Testing and Robust System Design, pp. 97-102 (2019).
*(note: copies of NPL in parent application(s)).

* cited by examiner

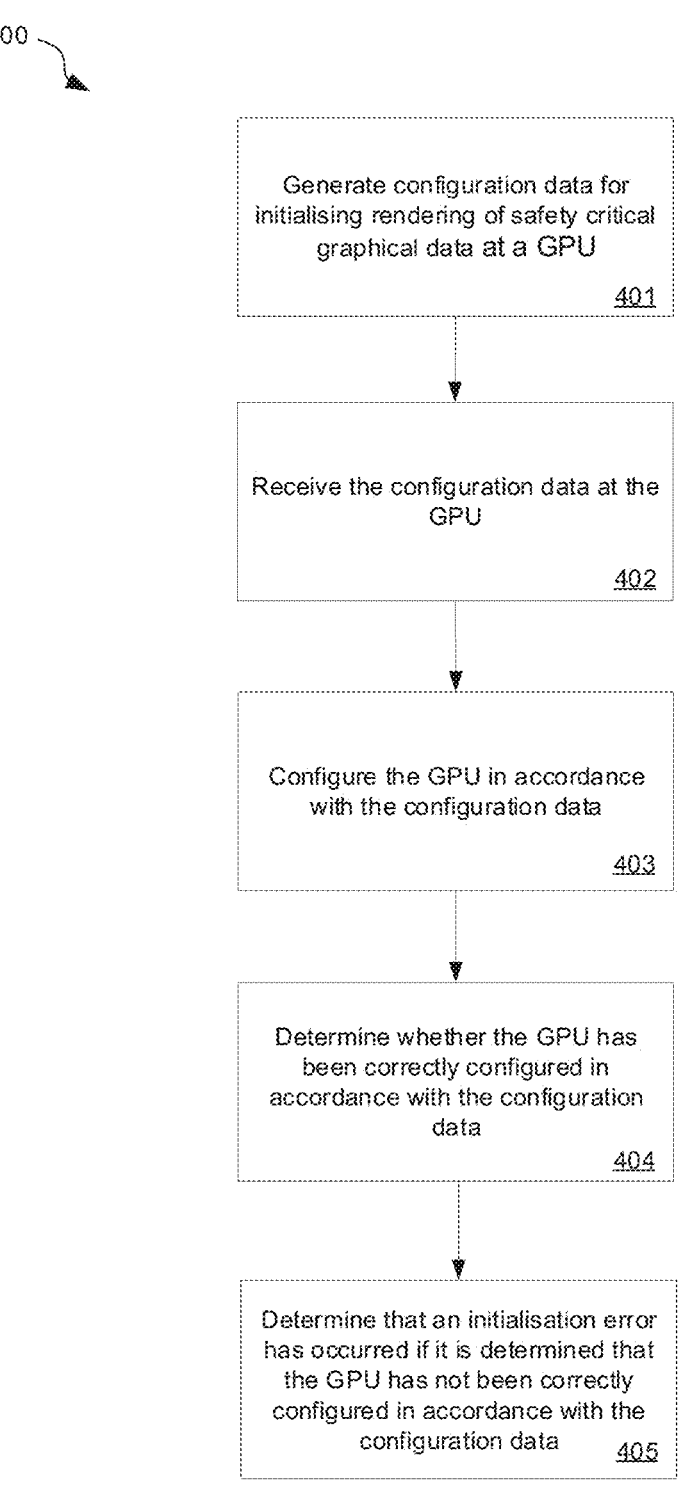

400

Generate configuration data for initialising rendering of safety critical graphical data at a GPU

401

Receive the configuration data at the GPU

402

Configure the GPU in accordance with the configuration data

403

Determine whether the GPU has been correctly configured in accordance with the configuration data

404

Determine that an initialisation error has occurred if it is determined that the GPU has not been correctly configured in accordance with the configuration data        405

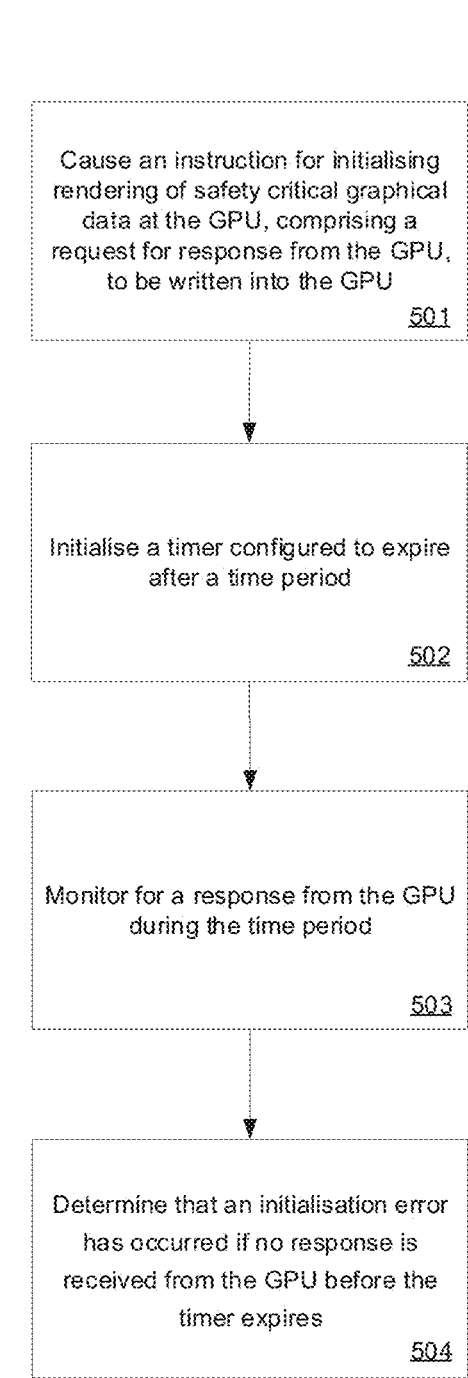

Cause an instruction for initialising rendering of safety critical graphical data at the GPU, comprising a request for response from the GPU, to be written into the GPU
501

Initialise a timer configured to expire after a time period
502

Monitor for a response from the GPU during the time period
503

Determine that an initialisation error has occurred if no response is received from the GPU before the timer expires
504

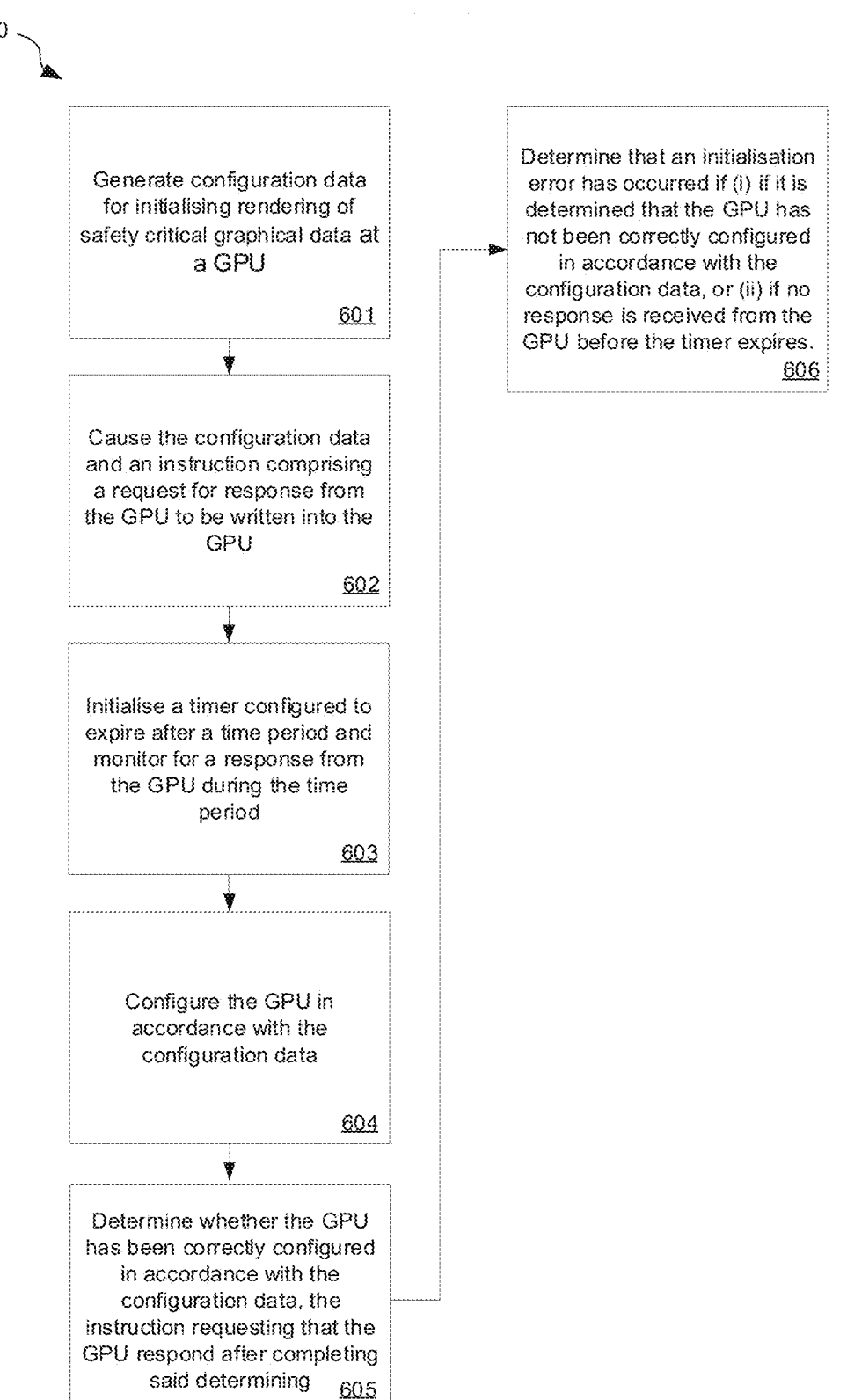

Generate configuration data for initialising rendering of safety critical graphical data at a GPU

601

Cause the configuration data and an instruction comprising a request for response from the GPU to be written into the GPU

602

Initialise a timer configured to expire after a time period and monitor for a response from the GPU during the time period

603

Configure the GPU in accordance with the configuration data

604

Determine whether the GPU has been correctly configured in accordance with the configuration data, the instruction requesting that the GPU respond after completing said determining    605

Determine that an initialisation error has occurred if (i) if it is determined that the GPU has not been correctly configured in accordance with the configuration data, or (ii) if no response is received from the GPU before the timer expires.

IC definition
dataset          →    Layout
processing    →    Circuit layout
definition    →    Integrated
circuit
generation    →    Integrated
circuit

DETECTING ERROR IN SAFETY-CRITICAL GPU BY MONITORING FOR RESPONSE TO AN INSTRUCTION

CROSS-REFERENCE TO RELATED APPLICATIONS AND CLAIM OF PRIORITY

This application is a continuation under 35 U.S.C. 120 of copending application Ser. No. 18/100,510 filed Jan. 23, 2023, now U.S. Pat. No. 12,033,236, which is a continuation of prior application Ser. No. 17/187,844 filed Feb. 28, 2021, now U.S. Pat. No. 11,587,198, which claims foreign priority under 35 U.S.C. 119 from United Kingdom Application No. 2002897.3 filed Feb. 28, 2020, the contents of which are incorporated by reference herein in their entirety.

BACKGROUND

The present disclosure relates to methods and graphics processing systems for initialising safety-critical rendering.

In safety-critical systems, at least some of the components of the system must meet safety goals sufficient to enable the system as a whole to meet a level of safety deemed necessary for the system. For example, in most jurisdictions, seat belt retractors in vehicles must meet specific safety standards in order for a vehicle provided with such devices to pass safety tests. Likewise, vehicle tyres must meet specific standards in order for a vehicle equipped with such tyres to pass the safety tests appropriate to a particular jurisdiction. Safety-critical systems are typically those systems whose failure would cause a significant increase in the risk to the safety of people or the environment.

Data processing devices often form an integral part of safety-critical systems, either as dedicated hardware or as processors for running safety-critical software. For example, fly-by-wire systems for aircraft, driver assistance systems, railway signalling systems and control systems for medical devices would typically all be safety-critical systems running on data processing devices. Where data processing devices form an integral part of a safety-critical system it is necessary for the data processing device itself to satisfy safety goals such that the system as a whole can meet the appropriate safety level. In the automotive industry, the safety level is normally an Automotive Safety Integrity Level (ASIL) as defined in the functional safety standard ISO 26262.

Increasingly, data processing devices for safety-critical systems comprise a processor running software. Both the hardware and software elements must meet specific safety goals. Some software failures can be systematic failures due to programming errors or poor error handling. These issues can typically be addressed through rigorous development practices, code auditing and testing protocols. Even if systematic errors could be completely excluded from a safety-critical system, random errors can be introduced into hardware, e.g. by transient events (e.g. due to ionizing radiation, voltage spikes, or electromagnetic pulses). In binary systems transient events can cause random bit-flipping in memories and along the data paths of a processor. The hardware may also have permanent faults.

The safety goals for a data processing device may be expressed as a set of metrics, such as a maximum number of failures in a given period of time (often expressed as Failures in Time, or FIT), and the effectiveness of mechanisms for detecting single point failures (Single Point Failure Mechanisms, or SPFM) and latent failures (Latent Failure Mechanisms, or LFM). There are various approaches to achieving safety goals set for data processing devices: for example, by providing hardware redundancy so that if one component fails another is available to perform the same task, or through the use of check data (e.g. parity bits or error-correcting codes) to allow the hardware to detect and/or correct for minor data corruptions.

For example, data processors can be provided in a dual lockstep arrangement 100 as shown in FIG. 1 in which a pair of identical processing cores 101 and 102 are configured to process a stream of instructions 103 in parallel. The output of either one of the processing cores (101) may be used as the output 104 of the lockstep processor. When the outputs of the processing cores 101 and 102 do not match, a fault can be raised to the safety-critical system. A delay 105 can be introduced on the input to one of the cores so as to improve the detection probability of errors induced by extrinsic factors such as ionizing radiation and voltage spikes (with typically a corresponding delay 106 being provided on the output of the other core). However, since a second processing core is required, dual lockstep processors are expensive in that they necessarily consume double the chip area compared to conventional processors and consume approximately twice the power.

Advanced driver-assistance systems and autonomous vehicles may incorporate data processing systems that are suitable for such safety-critical applications which have significant graphics and/or vector processing capability. However, the increases in the area and power consumption (and therefore cost) of implementing a dual lockstep processor might not be acceptable or desirable. For example, driver-assistance systems often provide computer-generated graphics illustrating hazards, lane position, and other information to the driver. Typically, this will lead the vehicle manufacturer to replace a conventional instrument cluster with a computer-generated instrument cluster which also means that the display of safety-critical information such as speed and vehicle fault information becomes computer-generated. Such processing demands can be met by graphics processing units (GPUs). However, in the automotive context, advanced driver-assistance systems typically require a data processing system which meets ASIL level B of ISO 26262.

For example, in the automotive context, graphics processing systems may be used to render an instrument cluster for display at a dashboard display screen. The instrument cluster provides critical information to the driver, such as vehicle speed and details of any vehicle faults. It is important that such critical information is reliably presented to the driver and vehicle regulations would typically require that the critical information is rendered in a manner which satisfies a predefined safety level, such as ASIL B of the ISO 26262 standard.

FIG. 2 illustrates an instrument cluster 200. The instrument cluster comprises a speedometer 202 in the form of a traditional dial having speed values 208 around the edge of the dial and a needle 207 whose angular orientation indicates the current speed of the vehicle. The instrument cluster further comprises an oil temperature gauge 203, an information icon 204 (e.g. indicating the selected radio station), a non-critical warning icon 205 (e.g. indicating a fault with the air conditioning system), and a critical warning icon 206 (e.g. indicating a serious engine problem). It may be necessary to render the instrument cluster 200 in a manner which satisfies a mandated safety level, such as ASIL B of the ISO 26262 standard.

Autonomous vehicles must in addition process very large amounts of data (e.g. from RADAR, LIDAR, map data and vehicle information) in real-time in order to make safety-critical decisions. Graphics processing units can also help meet such processing demands but safety-critical systems in autonomous vehicles are typically required to meet the most stringent ASIL level D of ISO 26262.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

According to a first aspect of the invention there is provided a method of initialising rendering at a graphics processing unit configured to perform safety-critical rendering, the method comprising: causing an instruction for initialising rendering of safety critical graphical data at the graphics processing unit to be provided to the graphics processing unit, said instruction comprising a request for response from the graphics processing unit; initialising a timer, said timer being configured to expire after a time period; and monitoring, during said time period, for a response from the graphics processing unit; determining, by a safety controller external to the graphics processing unit, that an initialisation error has occurred if no response is received from the graphics processing unit before the timer expires.

The safety controller may cause the graphics processing unit to be reset in response to determining that the initialisation error has occurred.

The method may further comprise: proceeding with rendering of safety critical graphical data at the graphics processing unit if the response from the graphics processing unit is received by the safety controller.

The time period may be determined in dependence on the safety critical graphical data to be rendered.

According to a second aspect of the present invention there is provided a graphics processing system comprising a graphics processing unit configured to perform safety-critical rendering and a safety controller for the graphics processing system, the safety controller being external to the graphics processing unit, in which the safety controller is configured to: cause an instruction for initialising rendering of safety critical graphical data at the graphics processing unit to be provided to the graphics processing unit, said instruction comprising a request for response from the graphics processing unit; initialise a timer, said timer being configured to expire after a time period; and monitor, during said time period, for a response from the graphics processing unit; anddetermining that an initialisation error has occurred if no response is received from the graphics processing unit before the timer expires.

The safety controller may cause the graphics processing unit to be reset in response to determining that the initialisation error has occurred.

The graphics processing unit may be configured to: proceed with rendering of safety critical graphical data if the response from the graphics processing unit is received by the safety controller.

According to a third aspect of the present invention there is provided a method of initialising rendering at a graphics processing unit configured to perform safety-critical rendering, the method comprising: generating configuration data for initialising rendering of safety critical graphical data at the graphics processing unit; causing an instruction comprising the configuration data for initialising rendering and a request for response from the graphics processing unit to be provided to the graphics processing unit; initialising a timer, said timer being configured to expire after a time period; monitoring, during the time period, for a response from the graphics processing unit; configuring the graphics processing unit in accordance with the configuration data for initialising rendering; determining whether the graphics processing unit is correctly configured in accordance with the configuration data, the instruction requesting that the graphics processing unit respond on completing said determining; and determine, by a safety controller external to the graphics processing unit, that an initialisation error has occurred if:(i) it is determined that the graphics processing unit is not correctly configured in accordance with the configuration data; or (ii) no response is received from the graphics processing unit before the timer expires.

The safety controller may cause the graphics processing unit to be reset in response to determining that the initialisation error has occurred.

The method may further comprise: proceeding with rendering of safety critical graphical data at the graphics processing unit if: (i) it is determined that the graphics processing unit is correctly configured in accordance with the configuration data; and (ii) the response from the graphics processing unit is received by the safety controller.

The configuration data may comprise one or more register entries to be written into one or more registers of the graphics processing unit, said configuration data specifying a configuration to be adopted by the graphics processing unit.

The configuring of the graphics processing unit in accordance with the configuration data may comprise one of: the safety controller writing the one or more register entries into the one or more registers; or a firmware of the graphics processing unit writing the one or more register entries into the one or more registers.

Determining whether the graphics processing unit has been correctly configured in accordance with the configuration data may comprise: reading the one or more register entries corresponding to the configuration data back from each of the one or more registers of the graphics processing unit after configuring the graphics processing unit; and comparing the one or more register entries read back from each register with an expected data entry for that register specified by the configuration data.

Determining whether the graphics processing unit has been correctly configured in accordance with the configuration data may comprise: reading the one or more register entries corresponding to the configuration data back from each of the one or more registers of the graphics processing unit after configuring the graphics processing unit; performing a checksum over the one or more register entries read back from the one or more registers; performing a checksum over the configuration data; and comparing the results of said checksums.

The checksum may be dependent upon the location of the one or more register entries within the one or more registers.

According to a fourth aspect of the present invention there may be provided a graphics processing system comprising a graphics processing unit configured to perform safety-critical rendering and a safety controller for the graphics processing system, the safety controller being external to the graphics processing unit, in which the safety controller is configured to: generate configuration data for initialising rendering of safety critical graphical data at the graphics processing unit; cause an instruction comprising the configuration data for initialising rendering and a request for response from the graphics processing unit to be provided to the graphics processing unit; initialise a timer, said timer being configured to expire after a time period;

monitor, during the time period, for a response from the graphics processing unit; cause the graphics processing unit to be configured in accordance with the configuration data for initialising rendering; determine whether the graphics processing unit is correctly configured in accordance with the configuration data, the instruction requesting that the graphics processing unit respond on completing said determining; and determining that an initialisation error has occurred if: (i) it is determined that the graphics processing unit is not correctly configured in accordance with the configuration data; or (ii) no response is received from the graphics processing unit before the timer expires.

The safety controller may cause the graphics processing unit to be reset in response to determining that the initialisation error has occurred.

The graphics processing unit may be configured to: proceeding with rendering of safety critical graphical data if: (i) it is determined that the graphics processing unit is correctly configured in accordance with the configuration data; and (ii) the response from the graphics processing unit is received by the safety controller.

The graphics processing system may be embodied in hardware on an integrated circuit. There may be provided a method of manufacturing, at an integrated circuit manufacturing system, the graphics processing system. There may be provided an integrated circuit definition dataset that, when processed in an integrated circuit manufacturing system, configures the system to manufacture the graphics processing system. There may be provided a non-transitory computer readable storage medium having stored thereon a computer readable description of an integrated circuit that, when processed in an integrated circuit manufacturing system, causes the integrated circuit manufacturing system to manufacture the graphics processing system.

There may be provided an integrated circuit manufacturing system comprising: a non-transitory computer readable storage medium having stored thereon a computer readable integrated circuit description that describes the graphics processing system; a layout processing system configured to process the integrated circuit description so as to generate a circuit layout description of an integrated circuit embodying the graphics processing system; and an integrated circuit generation system configured to manufacture the graphics processing system according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The present invention is described by way of example with reference to the accompanying drawings. In the drawings:

FIG. 4 is a flow diagram for a method of initialising safety-critical rendering at a graphics processing unit within a graphics processing system, in accordance with the principles described herein.

FIG. 5 is a flow diagram for another method of initialising safety-critical rendering at a graphics processing unit within a graphics processing system, in accordance with the principles described herein.

FIG. 6 is a flow diagram for yet another method of initialising safety-critical rendering at a graphics processing unit within a graphics processing system, in accordance with the principles described herein.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

The present disclosure relates to methods and graphics processing systems for initialising safety-critical rendering.

Figure 2:
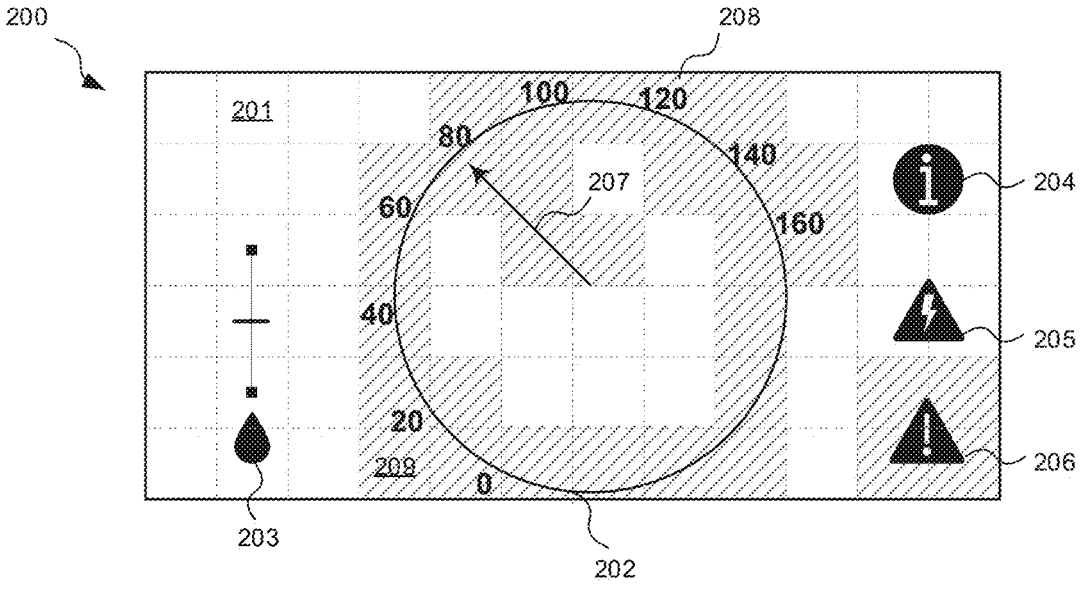
FIG. 2 shows a computer-generated instrument cluster for a vehicle.
Figure 3:
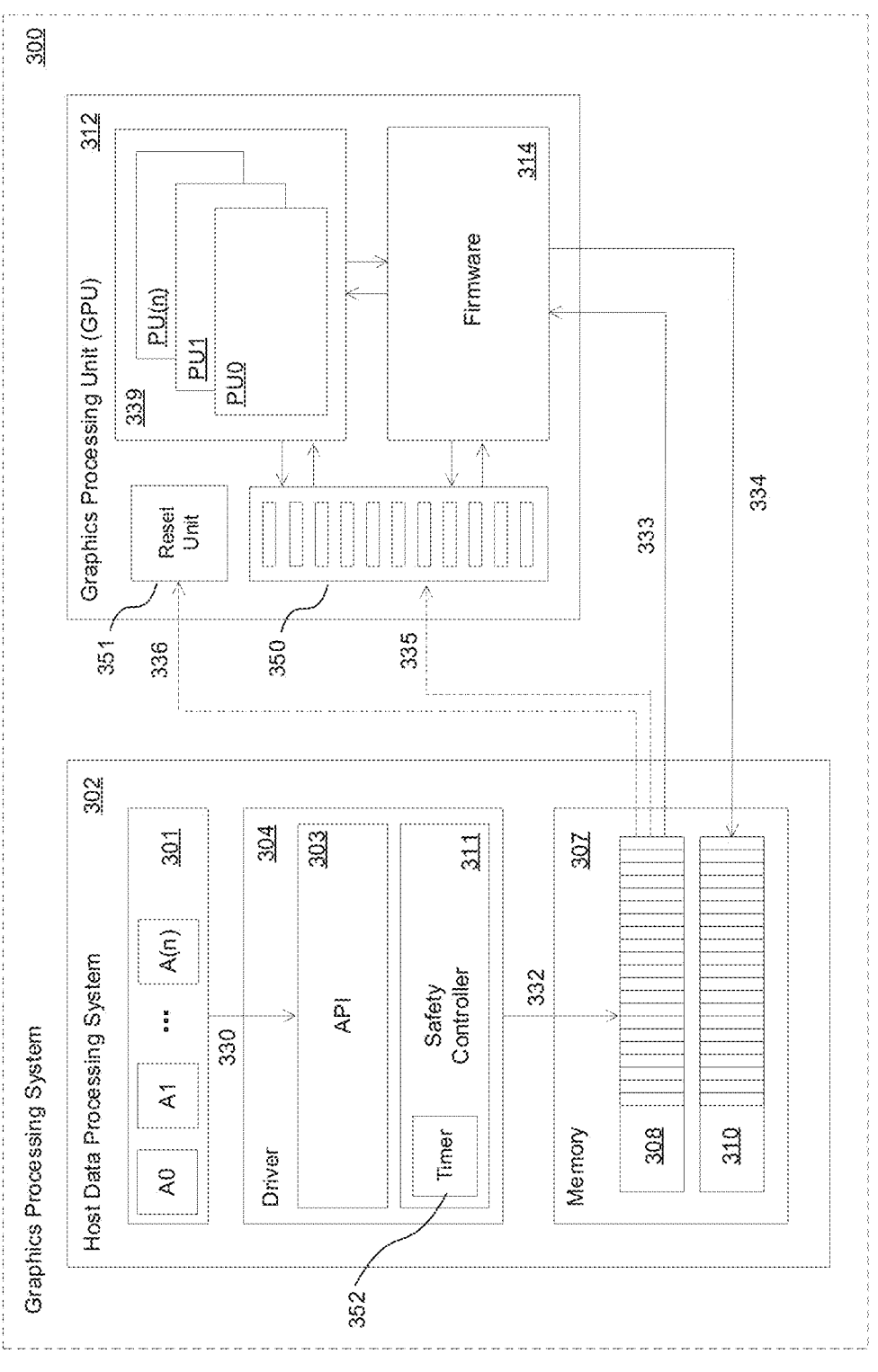
FIG. 3 is a schematic diagram of a graphics processing system for operation, in accordance with the principles described herein.

A graphics processing system 300 is shown in FIG. 3. Graphics processing system 300 comprises at least one graphics processing unit (GPU) 312. GPU 312 may be suitable for rendering the instrument cluster 200 shown in FIG. 2. GPU 312 may comprise hardware components (e.g. hardware processing units) and software components (e.g. firmware and procedures and tasks for execution at the hardware processing units). The operation and arrangement of the GPU units will vary depending on the particular architecture of the GPU.

GPU 312 may comprise one or more processing units 339, labelled in FIG. 3 as PU0, PU1 and PU(n). There may be any number of processing units in GPU 312. GPU 312 may also comprise firmware 314. Firmware 314 may be embodied in software, hardware, or any combination of software and hardware. For example, firmware 314 may be software being executed using hardware processing logic. Firmware 314 which may, for example, perform low-level management of the GPU and provide an interface for instructions directed to the GPU. In some arrangements, GPU 312 may be configured to execute software in the form of functions, routines and other code arranged for execution at units of the GPU (e.g. its processing units 339 and/or firmware 314).

GPU 312 may also comprise a register bank 350 comprising one or more registers. Register bank 350 may be accessible by the processing units 339. Data for the processing units 339 may be stored within the register bank 350, and read by those processing units 339. Said data may include data to be processed by the processing units 339, and/or configuration data specifying a configuration to be adopted by the processing units 339. For example, said configuration may determine how one of the processing units 339 processes data, such as during the rendering of graphical data. The register bank 350 may be populated and managed by firmware 314. That is, firmware 314 may have permission to read from and write into the one or more registers in the register bank 350. GPU 312 may also comprise any other form of memory (not shown). Said memory may comprise any type of memory, such as caches, or buffers.

GPU 312 may also comprise a reset unit 351 configured to cause a reset, such as a hardware recovery reset, of the GPU 312. The reset may involve returning some or all of the GPU flip-flops to a known safe state, and/or invalidating some or all data stored in memory, such as register bank 350, within the GPU 312. The reset may eliminate certain errors, such as those causing a GPU to malfunction. The reset may be instructed by the GPU 312 itself. Alternatively, said reset may be caused by a command 336 sent from an external entity, such as host data processing system 302.

GPU 312 may comprise various other functional elements for, by way of example, processing data, communicating with external devices such as host data processing system 302, and supporting the processing performed at the one or more processing units 339.

Graphics processing system 300 may also comprise a driver 304 for the GPU 312. For example, the driver 304 could be a software driver. The driver 304 may provide an interface to the GPU 312 for processes (e.g. software applications) running at a data processing system. In the example shown in FIG. 3, graphics processing system 300 comprises a host data processing system 302. One or more processes 301 may run on host data processing system 302. These processes 301 are labelled in FIG. 3 as A0, A1, A(n). There may be any number of processes 301 running on the host data processing system 302. One or more processes 301 may interact 330 with the GPU 312 by means of the driver 304. The host data processing system 302 may comprise one or more processors (e.g. CPUs—not shown) at which the processes 301 and driver 304 are executed. A graphics application programming interface (API) 303 (e.g. OpenGL) may be provided at the driver 304 by means of which the processes 301 can submit rendering calls. Driver 304 may be a software component of the host data processing system 302.

The API 303 may be arranged to receive draw calls from processes 301 so as to cause the GPU 312 to render a scene. For example, the API may be an OpenGL API and a process may be an application arranged to issue OpenGL draw calls so as to cause the GPU to render the instrument cluster shown in FIG. 2 to a display screen at the dashboard of a vehicle. Driver 304 also comprises a safety controller 311, which is discussed in further detail herein.

In the example depicted in FIG. 3, driver 304 generates command and/or control instructions so as to cause the GPU 312 to effect the draw calls submitted to the API 303 by a process 301. The instructions may pass data defining the scene to be rendered to the GPU 312 in any suitable manner—e.g. as a reference to the data in memory. As shown in FIG. 3, said instructions may be sent 332 to one or more buffers 308 in memory 307. GPU 312 may read 333 instructions from memory 307. Memory 307 may be provided at host data processing system 302. Memory 307 may also include a buffer 310 for receiving instructions returning from GPU 312. The buffers may be circular buffers.

Graphics processing unit 312 may be, for example, any kind of graphical and/or vector and/or stream processing unit. GPU 312 may comprise a rendering pipeline for performing geometry processing and/or fragment processing of primitives of a scene. Each processing unit 339 may be a different physical core of a GPU.

The following examples are described with reference to tile-based rendering techniques, however it is to be understood the that graphics processing system could instead or additionally be capable of other rendering techniques, such as immediate mode rendering or hybrid techniques that combine elements of both tile-based and immediate mode rendering.

A graphics processing system 300 configured in accordance with the principles herein may have any tile-based architecture-for example, the system could be operable to perform tile based deferred rendering. Each processing unit 339 depicted in FIG. 3 may be able to process a tile independently of any other processing unit and independently of any other tile.

Tile-based rendering systems use a rendering space which is subdivided into a plurality of tiles. As is known in the art, tiles can be any suitable shape and size, e.g. rectangular (including square) or hexagonal. A tile of the rendering space may relate to a portion of a render target, e.g. representing a frame which is to be rendered at a graphics processing system. A frame may be all or part of an image or video frame. In some examples, the render output is not a final image to be displayed, but instead may represent something else, e.g. a texture which can subsequently be applied to a surface when rendering an image which includes that texture. In the examples described below, the render output is a frame representing an image to be displayed, but it is to be understood that in other examples, the render output can represent other surfaces, such as textures or environment maps, etc.

Tile-based rendering systems generally perform two distinct phases of operation: (i) a geometry processing phase in which geometry (e.g. primitives) is processed to determine, for each tile of the rendering space, which items of geometry may be relevant for rendering that tile (e.g. which primitives at least partially overlap the tile), and (ii) a rendering phase (or "fragment processing phase") in which geometry relevant for rendering a particular tile is processed so as to render the tile—for example, to produce pixel values for the pixel positions in the tile, which can then be output from the rendering system, e.g. for storage in a buffer (such as a frame buffer) and/or for display. Processing geometry relevant to a tile may comprise, for example, generating primitive fragments by sampling the primitives at the sample positions of the tile, and determining which of the fragments are visible and determining how the fragments affect the appearance of the pixels. There may be a one-to-one relationship between the sample positions and the pixels. Alternatively, more than one sample position may relate to each pixel position, such that the final pixel values can be produced by combining rendered values determined for a plurality of sample positions. This can be useful for implementing anti-aliasing.

A graphics processing unit (such as GPU 312) may be configured to perform part or all of any aspect of graphics processing in the geometry processing phase and in the rendering phase, including, for example, tiling, geometry processing, texture mapping, shading, depth processing, vertex processing, tile acceleration, clipping, culling, primitive assembly, colour processing, stencil processing, anti-aliasing, ray tracing, pixelization and tessellation.

Geometry processing logic and fragment processing logic may share resources of a graphics processing unit (such as GPU 312). For example, the processing units of a graphics processing unit (such as processing units 339 of GPU 312) may be used to implement part of both the geometry processing logic and the fragment processing logic, e.g. by executing different software instructions on execution units of the processing units. Processing units (such as processing units 339) may be configured to perform SIMD processing.

A graphics processing system configured in accordance with the principles described herein may be arranged to render any kind of scene.

Returning to FIG. 3, a graphics processing system 300 in accordance with the principles described herein comprises at least one graphics processing unit (GPU) 312. The graphics processing system 300 also comprises a safety controller 311. Safety controller 311 may be embodied in hardware (e.g. fixed-function hardware), software or any combination thereof (e.g. as a software process running at general purpose hardware). Safety controller 311 may be in communication with GPU 312. Safety controller 311 may communicate with GPU 312 in any suitable manner. Safety controller 311 may be present in any suitable location. In one example, safety controller 311 and GPU 312 may be part of the same system on chip architecture. In FIG. 3, safety controller 311 is shown as being comprised within host data processing system 302. Safety controller 311 may be a component of driver 304, which provides an interface to the GPU 312 for processes 301 (e.g. software applications) running at the host data processing system 302.

Safety controller 311 may be configured to cause safety checks for GPU 312 to be performed. A safety check may be performed at any time. In an example, a safety check is performed when initialising the rendering of graphical data. For example, a safety check may be performed when the GPU 312 is initialised to perform the rendering of a frame of graphical data. Said frame may include data for safety-critical rendering. A safety check may be performed every time that the GPU 312 is initialised to perform the rendering of a frame of safety-critical data, or on a subset of those occasions. In another example, a safety check may be performed when the GPU 312 is initialised to perform the rendering of a tile of graphical data. Said tile may include data for safety-critical rendering. A safety check may be performed every time that the GPU 312 is initialised to perform the rendering of a tile of safety-critical data, or on a subset of those occasions. A safety check may be performed when initialising geometry processing, fragment processing, or both geometry processing and fragment processing.

FIG. 4 is a flow diagram 400 for a method of initialising safety-critical rendering at a graphics processing unit within a graphics processing system in accordance with the principles described herein.

One type of safety check caused by safety controller 311 may involve verifying whether a GPU 312 has been correctly configured to perform safety critical rendering. In order to perform this safety check, configuration data for initialising rendering of safety critical graphical data at the graphics processing unit is generated 401.

Said configuration data may, when read by a processing unit 339 of GPU 312, cause that processing unit 339 to adopt a specific configuration. For example, the configuration data may cause a processing unit 339 to be configured to perform a specific processing task, or series of processing tasks, on received data (such as graphical data). Said configuration data may also mandate from where (e.g. an address in memory 307) that a processing unit 339 is to retrieve data to be processed, and/or how intermediate data or final output generated during rendering is to be handled (e.g. stored and/or reported).

The configuration data may comprise one or more register entries to be written into one or more registers in register bank 350. Said register entries may comprise register data. The configuration data may dictate a specified configuration for the register entries. For example, the configuration data may dictate that specific register entries are to be written into specific registers, and/or define specific relationships between the register entries that are to be written into each register within register bank 350. In a simple example, configuration data may include register entries 1 to 10 to be written in ascending numerical order into registers A to J (not shown).

Safety controller 311 may generate one or more instructions comprising said configuration data. Said instruction(s) may be sent to GPU 312 via buffer 308 in memory 307. Configuration data relating to safety critical rendering may bypass the queue in buffer 308, such that it can be read into GPU 312 more quickly.

The configuration data is received 402 at the graphics processing unit (e.g. GPU 312). For example, the configuration data may be comprised within an instruction that is read from memory 307 into GPU 312.

The graphics processing unit (e.g. GPU 312) is configured 403 in accordance with the configuration data. In an example, said configuration data may be sent 333 to firmware 314 of GPU 312—and the firmware 314 may be responsible for writing the configuration data into the register bank 350. In another example, the safety controller 311 may cause the configuration data to be written 335 directly into the register bank 350. In this example, configuration data may also be sent 333 to firmware 314 of GPU 312 (the reasons for which are explained in the following paragraphs). A graphics processing unit may be considered to be configured in accordance with the configuration data once said configuration data has been written into the registers. The configuration data, once written into the registers, may cause the GPU to operate in one or more different modes, cause different combinations of components of the GPU to be switched on or off, and/or cause any other change to the configuration of the GPU.

According to the principles described herein, it is then determined 404 whether the graphics processing unit (e.g. GPU 312) has been correctly configured in accordance with the configuration data. This step may involve determining whether the configuration data has been correctly written into the one or more registers of register bank 350. For example, it may be determined whether register entries specified in the configuration data have been written into the register bank 350 in the specified configuration.

In an example, the safety controller 311 may compare the configuration data with the outcome of the configuration step. The comparison may be performed in any suitable manner.

In an example, safety controller 311 may read back the contents (e.g. the set of data entries) of each of the registers in register bank 350 and compare their contents to the expected contents according to the configuration data. That is, for each register, the safety controller 311 may check whether the read register entry matches the expected register entry for that register. In one example, this comparison may be completed before the register entries are subsequently modified as a result of rendering performed by GPU. That is, before the contents of the registers are accessed by a processing unit 339 in order to perform rendering. In another example, a snapshot of the register bank may be stored in the host data processing system 302. The snapshot may be a read back of data entries in the registers of the register bank 350 to a memory external to the GPU (such as memory 307 in the host data processing system 302). A snapshot of the register bank 350 may be published and sent 334, 337 to the safety controller 331 (e.g. via memory 307) for comparison to the configuration data. In this example, the snapshot of the register bank 350 may be verified by comparison to the expected contents according to the configuration data. That is, for each register, the safety controller 311 may check whether the register entry found in the snapshot matches the expected register entry for that register. Whilst this comparison is being performed, the contents of the actual registers may be used for rendering.

In another example, the safety controller 311 may perform the comparison by performing a checksum over the contents (e.g. the set of data entries) of the registers, and comparing that to an equivalent checksum performed over the configuration data. The checksum may be dependent upon the location of the data within the registers. In other words, the checksum may not be location invariant. That is, the checksum calculation may account for both the values of the stored register entries and their location within the register bank 350. In other words, the checksum may return different results when (i) the expected register entries are stored in the correct register locations, and (ii) the expected register entries are stored in the incorrect register locations. In an example, safety controller 311 may read back the contents of each of the registers in register bank 350 in order for a checksum to be performed. In another example, a snapshot of the register bank 350 may be stored by a memory external to the GPU (such as memory 307 in the host data processing system 302) in order for a checksum to be performed.

In an example, firmware 314 may compare the configuration data with the outcome of the configuration step. The comparison may be performed in any suitable manner.

In an example, firmware 314 may read back the contents (e.g. the set of data entries) of each of the registers in register bank 350 and compare their contents to the expected contents according to the configuration data. That is, for each register, the firmware may check whether the read register entry matches the expected register entry for that register. In one example, this comparison may be completed before the register entries are subsequently modified as a result of rendering performed by GPU. That is, before the contents of the registers are accessed by a processing unit 339 in order to perform rendering. In another example, a snapshot of the register bank may be stored by firmware 314. The snapshot may be a read back of data entries in the registers of the register bank 350 to an internal core memory (not shown) exclusive to the firmware 314. In this example, the snapshot of the register bank 350 may be verified by comparison to the expected contents according to the configuration data. That is, for each register, the firmware may check whether the register entry found in the snapshot matches the expected register entry for that register. Whilst this comparison is being performed, the contents of the actual registers may be used for rendering.

In another example, the firmware 314 may perform the comparison by performing a checksum over the contents (e.g. the set of data entries) of the registers, and comparing that to an equivalent checksum performed over the configuration data. The checksum may be dependent upon the location of the data within the registers. In other words, the checksum may not be location invariant. That is, the checksum calculation may account for both the values of the stored register entries and their location within the register bank 350. In other words, the checksum may return different results when (i) the expected register entries are stored in the correct register locations, and (ii) the expected register entries are stored in the incorrect register locations. In an example, firmware 314 may read back the contents of each of the registers in register bank 350 in order for a checksum to be performed. In another example, a snapshot of the register bank 350 may be stored by firmware 314 in order for a checksum to be performed.

In some examples, the GPU firmware (e.g. firmware 314) sets up a flag or status value to confirm that the determination step has been completed. Different flags or status values may be used to indicate whether it has been determined that the GPU 312 has been correctly or incorrectly configured.

In some examples, any combination of two or more of the comparisons described herein may be performed in order to determine whether the graphics processing unit (e.g. GPU 312) has been correctly configured in accordance with the configuration data.

According to the principles described herein, it is determined 405 that an initialisation error has occurred if it is determined that the graphics processing unit has not been correctly configured in accordance with the configuration data.

In response to determining that an initialisation error has occurred, the safety controller may cause the graphics processing unit to be reset. For example, referring to FIG. 3, if the firmware 314 determines that the GPU 312 has not been configured in accordance with the configuration data, it may inform 334 the host data processing system of the initialisation error via returning buffer 310 in memory 307. Safety controller 311 may then cause GPU 312 to be reset by commanding 336 reset unit 351.

A hardware recovery reset is an example of such a reset. A reset may involve returning some or all of the GPU flip-flops to a known safe state, and/or invalidating some or all data stored in memory, such as register bank 350, within the GPU 312. A reset may eliminate certain errors, such as those causing a GPU to malfunction (e.g. causing the GPU to be incorrectly configured). Resetting the GPU in this way may allow errors in configuration to be corrected before they can cause errors in the graphical rendering of a frame or tile.

The reset may comprise any other type of reset. For example, the reset may be a soft reset. A soft reset may comprise resetting the hardware components of the GPU 312. For example, during a soft reset, the processing units 339 may be re-initialised and returned to a known state, and register entries in register bank 350 may be invalidated. During a soft reset, the software components of the GPU 312, such as firmware 314, may continue to run. In contrast, a reset may be a hard reset. A hard reset may comprise resetting both the hardware and software components of GPU 312. For example, during a hard reset, the processing units 339 and firmware 314 may be re-initialised and returned to a known state, and register entries in register bank 350 may be invalidated may be invalidated or cleared. Any other type of reset that comprises invalidating the register entries in register bank 350 and resetting any other combination of the components of a graphics processing unit (such as GPU 312) is also possible.

In other examples, the safety controller 311 may inform other entities external to the GPU 312 that an initialisation error has occurred. For example, the safety controller may communicate the detected initialisation error to an application 301 running on the host data processing system 302, such as the application that submitted the rendering call with which the initialisation error is associated.

The graphics processing unit may proceed to perform rendering prior to the safety check described with reference to FIG. 4 being completed. If the safety check determines that the graphics processing unit has been configured in accordance with the configuration data, the rendering of graphical data may proceed. For example, the rendering of graphical data that has already begun may continue unaffected or the rendering of graphical data may not begin until the safety check has been completed.

Another type of safety check caused by safety controller 311 is described with reference to FIG. 5.

FIG. 5 is a flow diagram 500 for another method of initialising safety-critical rendering at a graphics processing unit within a graphics processing system in accordance with the principles described herein.

An instruction for initialising rendering of safety critical graphical data at the graphics processing unit is written into 501 the graphics processing unit (such as GPU 312). As described previously, a safety check may be performed when the GPU 312 is initialised to perform the rendering of a frame of graphical data. Said frame or tile may include data for safety-critical rendering. A safety check may be performed every time that the GPU 312 is initialised to perform the rendering of a frame of safety-critical data, or on a subset of those occasions. In another example, a safety check may be performed when the GPU 312 is initialised to perform the rendering of a tile of graphical data. Said tile may include data for safety-critical rendering. A safety check may be performed every time that the GPU 312 is initialised to perform the rendering of a tile of safety-critical data, or on a subset of those occasions. A safety check may be performed when initialising geometry processing, fragment processing, or both geometry processing and fragment processing.

The instruction for initialising rendering of safety critical graphical data comprises a request for a response from the GPU. The request for a response may require the GPU to respond immediately upon reading the request, or on completion of a predetermined task. The request for a response may be embedded in the instruction as a flag. For example, the flag may be present in an instruction header. Said instruction header may be in a kick command of the instruction. A kick command is the name given to an instruction or part of an instruction that instructs the GPU to begin processing a render or part of a render.

A timer may be initialised 502. Returning to FIG. 3, a timer 352 is schematically shown as a component of the safety controller 311. This is because the timer 352 may be under the control of the safety controller 311. It is to be understood that the timer could be located remotely from the safety controller 311. The timer may be configured to expire after a time period.

The time period may be defined as a measure of real time. For example, the time period may be 1 ms. Alternatively, the time period may be defined relative to a number of processor clocks (e.g. according to the clock rate of the GPU on which processing is being initialised). For example, the time period may be 1,000,000 clocks.

The time period may be set relative to the expected duration of the graphical processing being initialised. For example, the time period may be set such that it represents a fraction or percentage of the expected duration of the graphical processing being initialised. For example, the time period may be set as 10% of the expected duration of the graphical processing being initialised. That is, the time period may be determined in dependence on the graphical processing being initialised.

In other examples, the timer period may be predetermined. For example, the time period may be set at design time. The time period may be set at design time for the graphics processing system, or for individual graphics processing units included in the graphics processing system.

Alternatively, the time period may be user-configurable. A user may set a desired time period when setting up an application 301 for running on the host data processing system 302. In another example, the desired time period may be determined by an application 301 running on the host data processing system 302. An application may communicate said desired time period to the safety controller 311 (e.g. in the example shown in FIG. 3, via API 303 in driver 304).

In an example, the timer may be initialised when the instruction for initialising rendering of safety critical graphical data at the GPU is sent 332 from the safety controller 311 (e.g. to a buffer 308 in memory 307). In another example, the timer may be initialised when the instruction is sent 333 from the host data processing system 302 (e.g. when the instruction departs from buffer 308). The timer may be initialised at any other suitable time.

During the time period, the safety controller monitors 503 for a response from the graphics processing unit (e.g. GPU 312). As described herein, the instruction for initialising rendering of safety critical graphical data comprises a request for a response from the GPU. Referring to FIG. 3, the firmware 314 of GPU 312 may act on the request for response. For example, on receiving (e.g. via 333) the instruction comprising a request for a response from the GPU 312, the firmware 314 may read the request for a response, and then send 334 a response to the safety controller 311 (e.g. via memory 307). Any suitable response may be sent. For example, the response may comprise an interrupt. Said interrupt may cause the host data processing system 302 to read a message in system memory.

According to the principles described herein, it is determined 504 that an initialisation error has occurred if no response is received from the GPU before the timer expires.

In response to determining that an initialisation error has occurred, the safety controller may cause the graphics processing unit to be reset. Referring to FIG. 3, safety controller 311 may cause GPU 312 to be reset by commanding 336 reset unit 351. As described herein, the reset performed may be a hardware recovery reset, a soft reset, a hard reset, or may involve resetting any combination of one or more units of the GPU 312.

In other examples, the safety controller 311 may inform other entities external to the GPU 312 that an initialisation error has occurred. For example, the safety controller may communicate the detected initialisation error to an application 301 running on the host data processing system 302, such as the application that submitted the rendering call with which the initialisation error is associated.

In some examples, no response is received from the GPU because it has stalled, locked-up, or faulted. For example, a fault may occur when an invalid memory access occurs and the memory management unit signals a page fault. Thus, performing the method described herein with reference to FIG. 5 enables GPU stalls or lock-ups to be efficiently identified and resolved (e.g. through a reset).

Rendering of graphical data by the graphics processing unit may be performed whilst a safety check as described with reference to FIG. 5 is being performed on that graphics processing unit. If a response is received before the time period expires the rendering of graphical data may proceed. For example, the rendering of graphical data that has already begun may continue unaffected or the rendering of graphical data may not begin until the safety check has been completed.

The methods described with reference to FIGS. 4 and 5 are used in combination. This type of safety check caused by safety controller 311 is described with reference to FIG. 6.

FIG. 6 is a flow diagram 600 for yet another method of initialising safety-critical rendering at a graphics processing unit within a graphics processing system in accordance with the principles described herein.

Configuration data for initialising rendering of safety critical graphical data at the graphics processing unit (e.g. GPU 312) may be generated 601. Configuration data may be generated in accordance with the principles described herein with reference to FIG. 4.

The configuration data and an instruction comprising a request for response from the graphics processing unit (as described herein) may be written into 602 the graphics processing unit (e.g. GPU 312). Configuration data may be written into the GPU in accordance with the principles described herein with reference to FIG. 4. In an example, the configuration data may be comprised within the kick command comprising a request for response from the GPU. For example, the configuration data may form the body of the command, whilst the request for a response from the GPU is present as an instruction flag in the command header. In another example, the configuration data may be comprised in one or more different instructions.

A timer may be initialised 603. The timer may be configured to expire after a time period. The timer may be initialised according to the principles described herein with reference to FIG. 5. During the time period, the safety controller monitors for a response from the graphics processing unit (e.g. GPU 312), in accordance with the principles described herein with reference to FIG. 5.

The graphics processing unit (e.g. GPU 312) may be configured 604 in accordance with the configuration data in the instruction according the principles described herein with reference to FIG. 4. As described herein, the instruction comprises a request for response from the GPU. In an example, it is requested that a response from the GPU be sent once the GPU 312 has been configured in accordance with the configuration data. In another example, it is requested that a response from the GPU 312 be sent once the firmware 314 reads the request for response.

According to the principles described herein with reference to FIG. 4, it is determined 605 whether the graphics processing unit (e.g. GPU 312) has been correctly configured in accordance with the configuration data.

According to the principles described herein, it is determined 606 that an initialisation error has occurred if it is determined that the graphics processing unit has not been correctly configured in accordance with the configuration data. In addition, according to the principles described herein, it is determined 606 that an initialisation error has occurred if it is determined that no response is received from the GPU before the timer expires.

In response to determining that an initialisation error has occurred, the safety controller may cause the graphics processing unit to be reset as described with reference to FIGS. 4 and 5. In other examples, the safety controller 311 may inform other entities external to the GPU 312 that an initialisation error has occurred. For example, the safety controller may communicate the detected initialisation error to an application 301 running on the host data processing system 302, such as the application that submitted the rendering call with which the initialisation error is associated.

Rendering of graphical data by the graphics processing unit may be performed whilst a safety check as described with reference to FIG. 6 is being performed on that graphics processing unit. If it is determined that the graphics processing unit has been configured in accordance with the configuration data and a response is received before the time period expires the rendering of graphical data may proceed. For example, the rendering of graphical data that has already begun may continue unaffected or the rendering of graphical data may not begin, or be suspended, until the safety check has been completed.

In examples, a second timer may be initialised. The second timer may be configured to expire after a second time period. The second time period may be shorter than the time period previously described herein (referred to in the following paragraphs as the first time period, associated with the first timer).

Each time period may be defined as a measure of real time. For example, the first time period may be 1 ms and the second time period may be 0.5 ms. Alternatively, each time period may be defined relative to a number of processor clocks (e.g. according to the clock rate of the GPU on which processing is being initialised). For example, the first time period may be 1,000,000 clocks and the second time period may be 500,000 clocks.

Each time period may be set relative to the expected duration of the graphical processing being initialised. For example, each time period may be set such that it represents a fraction or percentage of the expected duration of the graphical processing being initialised. For example, the first time period may be set as 10% of the expected duration of the graphical processing being initialised, and the second time period may be set as 5% of the expected duration of the graphical processing being initialised. That is, each time period may be determined in dependence on the graphical processing being initialised.

In other examples, each timer period may be predetermined. For example, each time period may be set at design time. Each time period may be set at design time for the graphics processing system, or for individual graphics processing units included in the graphics processing system. Alternatively, each time period may be user-configurable. A user may set desired time periods when setting up an application 301 for running on the host data processing system 302. In another example, desired time periods may be determined by an application 301 running on the host data processing system 302. An application may communicate said desired time period to the safety controller (e.g. in the example shown in FIG. 3, via API 303 in driver 304).

The first timer and the second timer may be initialised at the same time.

During the first and second time periods, the safety controller may monitor for a response from the graphics processing unit (e.g. GPU 312). For example, the GPU 312 may be instructed to respond once it has been determined whether the GPU has been configured in accordance with the configuration data, as described with reference to FIG. 6.

In an example, if no response is received before the second time period expires, but a response is received before the first time period expires and it is determined that the GPU has been correctly configured in accordance with the configuration data, it may be determined that the GPU 312 is functioning correctly (e.g. the GPU has not locked up, stalled or faulted), but that its workload has exceeded an acceptable threshold. In this example, the safety controller may manage the workload of the GPU 312. For example, the safety manager may cause the rate at which graphical processing instructions are sent to the GPU to be reduced. The degree to which the GPU's workload is decreased may depend on the duration of time surpassed before a response was received.

The response of the safety controller with regards to the monitoring performed during the first time period is described herein with reference to FIG. 6.

Initialising rendering in accordance with the principles described herein with reference to FIG. 4, 5 or 6 is advantageous over performing resets only in response to detecting a fault in a GPU's render output (such as a frame or tile rendered by a graphics processing unit). This is because the latter approach often involves waiting for frame to complete rendering before an error can be detected. In some examples, an incorrectly configured GPU may not even be able to complete rendering of a frame or tile. The safety checks performed in accordance with the principles described herein with reference to FIG. 4, 5 or 6 can be performed in a fraction of the time that it typically takes for a frame to be rendered. For this reason, a fault can be detected, and optionally cleared by resetting the GPU, before that fault manifests itself in an incorrectly rendered frame or tile (and before the GPU commits time and resources to incorrectly rendering that frame or tile). Thus, the detection and elimination of faults can be performed more efficiently.

Figure 1:
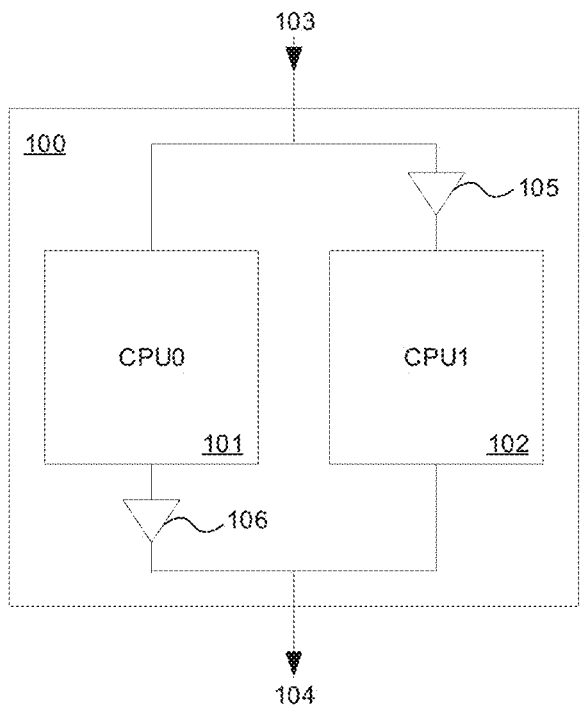
FIG. 1 is a schematic diagram of a conventional dual lockstep processor.

For example, detecting a transient fault may require a dual-lockstep type arrangement to be implemented-as described with reference to FIG. 1. In such an arrangement, a pair of identical processing cores 101 and 102 are configured to process a stream of instructions 103 in parallel. The outputs of the processing cores 101 and 102 can be compared. When the outputs of the processing cores 101 and 102 do not match, a fault can be raised to the safety-critical system. This approach to detecting faults requires the rendering of a frame or tile to be completed, so that the outputs of each of the processing cores 101 and 102 can be compared. In addition, a second processing core is required to implement a dual lockstep processor, making them expensive in that they necessarily consume double the chip area compared to conventional processors and consume approximately twice the power. That said, it is to be understood that the method of initialising safety-critical rendering at a graphics processing unit in accordance with the principles described herein may be used in combination with such approaches. This may be appropriate for graphics processing systems with highly-stringent safety requirements. For example, rendering may be initialised in accordance with the principles described herein for one or both of processing cores 101 and 102 in a dual lockstep arrangement.

Initialising rendering in accordance with the principle described herein also improves the robustness of a graphics processing system by verifying the data path from the host data processing system to a GPU's register bank via its firmware.

Safety controller 311 may selectively perform safety checks for only the GPUs performing safety critical rendering. For example, the instrument cluster 200 shown in FIG. 2 comprises a speedometer 202 in the form of a traditional dial having speed values 208 around the edge of the dial and a needle 207 whose angular orientation indicates the current speed of the vehicle. The instrument cluster 200 further comprises an oil temperature gauge 203, an information icon 204 (e.g. indicating the selected radio station), a non-critical warning icon 205 (e.g. indicating a fault with the air conditioning system), and a critical warning icon 206 (e.g. indicating a serious engine problem). In this example, only the speedometer 202 and the critical warning icon 206 of the display elements are deemed to be critical to the safety of the vehicle and its occupants. It may be necessary to render those display elements in a manner which satisfies a mandated safety level, such as ASIL B of the ISO 26262 standard. The oil temperature gauge 203, information icon 204 and non-critical warning icon 205 do not need to be rendered to that safety level. The rendering space used to render the frame representing the rendered instrument cluster is divided into a plurality of tiles 201 each comprising a plurality of pixels. Only the highlighted tiles 209 include the critical display elements in that at least part of a critical display element overlaps with each of the highlighted tiles. The safety controller 311 may perform safety checks for only the processing unit(s) 339 or GPU(s) that are configured to perform the rendering of the highlighted tiles., and/or only for instructions associated with the rendering of the highlighted tiles.

The graphics processing system of FIG. 3 is shown as comprising a number of functional blocks. This is schematic only and is not intended to define a strict division between different logic elements of such entities. Each functional block may be provided in any suitable manner. It is to be understood that intermediate values described herein as being formed by graphics processing system need not be physically generated by the graphics processing system at any point and may merely represent logical values which conveniently describe the processing performed by a graphics processing system between its input and output.

A graphics processing system described herein may be embodied in hardware on one or more integrated circuits. The graphics processing system described herein may be configured to perform any of the methods described herein.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

A processor, computer, or computer system may be any kind of device, machine or dedicated circuit, or collection or portion thereof, with processing capability such that it can execute instructions. A processor may be any kind of general purpose or dedicated processor, such as a CPU, GPU, vector processor, tensor processor, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit definition dataset.

There may be provided a method of manufacturing, at an integrated circuit manufacturing system, a graphics processing system as described herein. There may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation.

As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 7.

Figure 7:
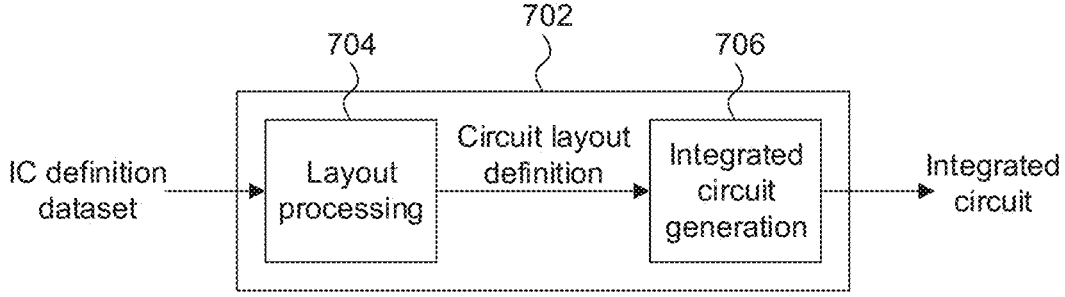
FIG. 7 is a schematic diagram of an integrated circuit manufacturing system.

FIG. 7 shows an example of an integrated circuit (IC) manufacturing system 702 which is configured to manufacture a graphics processing system as described in any of the examples herein. In particular, the IC manufacturing system 702 comprises a layout processing system 704 and an integrated circuit generation system 706. The IC manufacturing system 702 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 702 to manufacture an integrated circuit embodying a graphics processing system as described in any of the examples herein.

The layout processing system 704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 704 has determined the circuit layout it may output a circuit layout definition to the IC generation system 706. A circuit layout definition may be, for example, a circuit layout description.

The IC generation system 706 generates an IC according to the circuit layout definition, as is known in the art. For example, the IC generation system 706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 706 may be in the form of computer-readable code which the IC generation system 706 can use to form a suitable mask for use in generating an IC.

The different processes performed by the IC manufacturing system 702 may be implemented all in one location, e.g. by one party. Alternatively, the IC manufacturing system 702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of detecting an error at a graphics processing unit, the method comprising:
   causing an instruction to be provided to the graphics processing unit, said instruction comprising a request for a response to be sent from the graphics processing unit to a safety controller;
   initialising a timer, said timer being configured to expire after a time period;
   monitoring, during said time period, for the response from the graphics processing unit; and
   determining that an error has occurred in response to determining that the response is not received from the graphics processing unit before the timer expires.

2. The method as claimed in claim 1, wherein the method further comprises causing the graphics processing unit to be reset in response to determining that the error has occurred.

3. The method as claimed in claim 1, wherein the graphics processing unit is configured to perform safety-critical rendering.

4. The method as claimed in claim 1, wherein the instruction is for initialising rendering of graphical data at the graphics processing unit, and wherein the time period is determined in dependence on the graphical data to be rendered.

5. The method as claimed in claim 4, wherein the graphical data is safety critical graphical data.

6. The method as claimed in claim 1, wherein the instruction is for initialising rendering of graphical data at the graphics processing unit, and wherein the time period is determined in dependence on the expected duration of the graphical processing being initialised.

7. The method as claimed in claim 1, wherein the timer is initialised when the instruction is sent to the graphics processing unit from the safety controller.

8. The method as claimed in claim 1, wherein the method comprises determining by the safety controller that the error has occurred in response to determining that the response is not received from the graphics processing unit before the timer expires.

9. A graphics processing system comprising a graphics processing unit and a safety controller, in which the safety controller is configured to:
   cause an instruction to be provided to the graphics processing unit, said instruction comprising a request for a response to be sent from the graphics processing unit to the safety controller;
   initialise a timer, said timer being configured to expire after a time period;
   monitor, during said time period, for the response from the graphics processing unit; and
   determine that an error has occurred if the response is not received from the graphics processing unit before the timer expires.

10. A graphics processing system comprising a graphics processing unit and a safety controller, in which the safety controller is configured to:
   generate configuration data for the graphics processing unit;
   cause an instruction to be provided to the graphics processing unit, said instruction comprising the configuration data and a request for a response to be sent from the graphics processing unit to the safety controller;
   initialise a timer, said timer being configured to expire after a time period;
   monitor, during the time period, for the response from the graphics processing unit;
   configure the graphics processing unit in accordance with the configuration data;
   determine whether the graphics processing unit is correctly configured in accordance with the configuration data; and
   determine that an error has occurred in response to determining that:
      (i) the graphics processing unit is not correctly configured in accordance with the configuration data; or
      (ii) the response is not received from the graphics processing unit before the timer expires.

11. The graphics processing system as claimed in claim 10, in which the safety controller is further configured to cause the graphics processing unit to be reset in response to determining that the error has occurred.

12. The graphics processing system as claimed in claim 10, wherein the safety controller is external to the graphics processing unit.

13. The graphics processing system as claimed in claim 10, wherein the configuration data comprises one or more register entries to be written into one or more registers of the graphics processing unit, said configuration data specifying a configuration to be adopted by the graphics processing unit.

14. The graphics processing system as claimed in claim 13, in which the safety controller is further configured to determine whether the graphics processing unit is correctly configured in accordance with the configuration data by determining whether the configuration data has been correctly written into one or more registers of the graphics processing unit.

15. The graphics processing system as claimed in claim 13, in which the safety controller is further configured to determine whether the graphics processing unit has been correctly configured in accordance with the configuration data by:
   reading the one or more register entries corresponding to the configuration data back from each of the one or more registers of the graphics processing unit after the graphics processing unit has been configured; and
   comparing the one or more register entries read back from each register with an expected data entry for that register specified by the configuration data.

16. The graphics processing system as claimed in claim 13, in which the safety controller is further configured to determine whether the graphics processing unit has been correctly configured in accordance with the configuration data by:

reading the one or more register entries corresponding to the configuration data back from each of the one or more registers of the graphics processing unit after the graphics processing unit has been configured;

performing a checksum over the one or more register entries read back from the one or more registers;

performing a checksum over the configuration data; and comparing the results of said checksums.

17. The graphics processing system as claimed in claim 10, wherein the graphics processing unit is configured to perform safety-critical rendering.

18. The graphics processing system as claimed in claim 10, wherein the configuration data is for initialising rendering of graphical data at the graphics processing unit.

19. The graphics processing system as claimed in claim 18, wherein the graphical data is safety critical graphical data.

20. The graphics processing system as claimed in claim 10, wherein the timer is initialised when the instruction is sent from the safety controller.

\* \* \* \* \*